US009322652B2

(12) United States Patent
Mein et al.

(10) Patent No.: US 9,322,652 B2
(45) Date of Patent: Apr. 26, 2016

(54) STEREO PHOTOGRAMMETRY FROM A SINGLE STATION USING A SURVEYING INSTRUMENT WITH AN ECCENTRIC CAMERA

(71) Applicant: Trimble AB, Danderyd (SE)

(72) Inventors: Nick Mein, Christchurch (NZ); Set Svanholm, Sollentuna (SE); Christian Graesser, Vallentuna (DE); Michael Vogel, Schleifreisen (DE)

(73) Assignee: Trimble AB, Danderyd (SE)

( * ) Notice: Subject to any disclaimer, the term of this patent is extended or adjusted under 35 U.S.C. 154(b) by 0 days.

(21) Appl. No.: 14/523,677

(22) Filed: Oct. 24, 2014

(65) Prior Publication Data

US 2015/0062309 A1 Mar. 5, 2015

Related U.S. Application Data

(63) Continuation of application No. 12/363,693, filed on Jan. 30, 2009, now Pat. No. 8,897,482, which is a continuation-in-part of application No. PCT/EP2008/052531, filed on Feb. 29, 2008, and a (Continued)

(51) Int. Cl.
*G06K 9/00* (2006.01)
*G01C 11/02* (2006.01)
(Continued)

(52) U.S. Cl.
CPC .............. *G01C 11/025* (2013.01); *G01C 1/04* (2013.01); *G01C 15/00* (2013.01); *G06T 7/0075* (2013.01); *G06T 2207/10012* (2013.01); *G06T 2207/30181* (2013.01)

(58) Field of Classification Search
None
See application file for complete search history.

(56) References Cited

U.S. PATENT DOCUMENTS 2,305,233 A * 12/1942 Blaschke ................. G01C 5/00
248/178.1
4,763,151 A * 8/1988 Klinger ................. F16M 11/04
248/179.1

(Continued)

FOREIGN PATENT DOCUMENTS

CN 1727845 A 2/2006
CN 101101210 A 1/2008

(Continued)

OTHER PUBLICATIONS

Non-Final Office Action of Feb. 5, 2015 for U.S. Appl. No. 12/735,805, 27 pages.
International Preliminary Report on Patentability for PCT/EP/2008/052531 dated Apr. 15, 2010, 7 pages.
International Search Report for PCT/EP2008/001053 dated Nov. 13, 2008, 3 pages.
International Search Report dated for PCT/EP2008/058183 dated Nov. 12, 2008, 3 pages.
International Search Report dated for PCT/EP2008/058175 dated Nov. 6, 2008, 3 pages.

(Continued)

*Primary Examiner* — Avinash Yentrapati
(74) *Attorney, Agent, or Firm* — Kilpatrick Townsend & Stockton LLP

(57) ABSTRACT

A method for determining, in relation to a surveying instrument, target coordinates of a point of interest, or target, identified in two images captured by a camera in the surveying instrument. The method comprises determining coordinates of the surveying instrument, capturing a first image using the camera in the first camera position; identifying, in the first image, an object point associated with the target; measuring first image coordinates of the object point in the first image; rotating the surveying instrument around the horizontal axis and the vertical axis in order to position the camera in a second camera position; capturing a second image using the camera in the second camera position; identifying, in the second image, the object point identified in the first image; measuring second image coordinates of the object point in the second image; and determining the coordinates of the target in relation to the surveying instrument.

20 Claims, 8 Drawing Sheets

Related U.S. Application Data continuation-in-part of application No. PCT/EP2008/058183, filed on Feb. 12, 2008.

(60) Provisional application No. 61/143,357, filed on Jan. 8, 2009.

(51) Int. Cl.
*G01C 1/04* (2006.01)
*G01C 15/00* (2006.01)
*G06T 7/00* (2006.01)

(56) References Cited

U.S. PATENT DOCUMENTS

| | | | |
|---|---|---|---|
| 5,642,285 A | | 6/1997 | Woo et al. |
| 5,930,740 A | * | 7/1999 | Mathisen ................ 702/152 |
| 5,949,548 A | | 9/1999 | Shirai et al. |
| 6,044,567 A | * | 4/2000 | Feist ......................... 33/292 |
| 6,147,598 A | | 11/2000 | Murphy et al. |
| 6,282,362 B1 | | 8/2001 | Murphy et al. |
| 6,301,447 B1 | * | 10/2001 | Jackson et al. .............. 396/329 |
| 6,384,902 B1 | | 5/2002 | Schneider |
| 6,411,372 B1 | | 6/2002 | Donath et al. |
| 6,453,569 B1 | | 9/2002 | Kumagai et al. |
| 6,559,931 B2 | | 5/2003 | Kawamura et al. |
| 6,663,299 B1 | * | 12/2003 | Shupak ................ G03B 17/00 396/28 |
| 6,688,010 B1 | | 2/2004 | Schwaerzler |
| 7,200,945 B2 | | 4/2007 | Endo |
| 7,218,384 B2 | * | 5/2007 | Shirai et al. ................ 356/3.01 |
| 7,339,611 B2 | | 3/2008 | Marold et al. |
| 7,503,123 B2 | | 3/2009 | Matsuo et al. |
| 7,508,980 B2 | | 3/2009 | Otani et al. |
| 7,541,974 B2 | | 6/2009 | Scherzinger |
| 7,619,561 B2 | | 11/2009 | Scherzinger |
| 7,623,224 B2 | * | 11/2009 | Vogel ....................... 356/141.5 |
| 7,697,127 B2 | | 4/2010 | Vogel et al. |
| 7,697,749 B2 | | 4/2010 | Ogawa |
| 7,719,467 B2 | | 5/2010 | Norda et al. |
| 7,793,424 B2 | * | 9/2010 | Laabs ................ G01C 15/002 33/290 |
| 7,908,752 B2 | * | 3/2011 | Hertzman et al. ............. 33/290 |
| 7,930,835 B2 | * | 4/2011 | Svanholm et al. ............. 33/290 |
| 8,897,482 B2 | | 11/2014 | Mein et al. |
| 2001/0050764 A1 | | 12/2001 | Shirai |
| 2002/0001406 A1 | | 1/2002 | Kochi et al. |
| 2002/0191839 A1 | | 12/2002 | Ito et al. |
| 2003/0048438 A1 | | 3/2003 | Kawamura et al. |
| 2003/0160757 A1 | * | 8/2003 | Shirai et al. ................. 345/156 |
| 2004/0004706 A1 | * | 1/2004 | Uezono et al. .................... 356/3 |
| 2004/0131248 A1 | | 7/2004 | Ito et al. |
| 2004/0233461 A1 | * | 11/2004 | Armstrong et al. .......... 356/620 |
| 2005/0057745 A1 | | 3/2005 | Bontje |
| 2005/0069195 A1 | * | 3/2005 | Uezono et al. ................ 382/154 |
| 2005/0125142 A1 | | 6/2005 | Yamane |
| 2006/0013473 A1 | * | 1/2006 | Woodfill et al. ............... 382/154 |
| 2006/0013474 A1 | | 1/2006 | Kochi et al. |
| 2006/0017938 A1 | | 1/2006 | Ohtomo et al. |
| 2006/0021236 A1 | * | 2/2006 | Endo .............................. 33/290 |
| 2006/0167648 A1 | | 7/2006 | Ohtani |
| 2007/0008515 A1 | * | 1/2007 | Otani ......................... G01C 3/00 356/5.02 |
| 2007/0065004 A1 | | 3/2007 | Kochi et al. |
| 2007/0104353 A1 | * | 5/2007 | Vogel ............................ 382/106 |
| 2007/0141976 A1 | | 6/2007 | Shimakawa et al. |
| 2008/0075325 A1 | | 3/2008 | Otani et al. |
| 2008/0120855 A1 | | 5/2008 | Matsuo et al. |
| 2008/0123112 A1 | * | 5/2008 | Marsh et al. .................. 356/625 |
| 2009/0109420 A1 | * | 4/2009 | Kludas et al. ................ 356/3.01 |
| 2009/0138233 A1 | * | 5/2009 | Kludas et al. ................ 702/158 |
| 2009/0153811 A1 | * | 6/2009 | Braiman ..................... A63J 5/02 353/121 |
| 2009/0262974 A1 | | 10/2009 | Lithopoulos |
| 2010/0037474 A1 | * | 2/2010 | Hertzman et al. ............. 33/290 |
| 2010/0074532 A1 | | 3/2010 | Gordon et al. |
| 2010/0088910 A1 | * | 4/2010 | Svanholm ............ G01C 15/002 33/290 |
| 2010/0092165 A1 | * | 4/2010 | Cartoni ................... F16M 11/10 396/428 |
| 2010/0103431 A1 | * | 4/2010 | Demopoulos ................. 356/622 |
| 2010/0141759 A1 | | 6/2010 | Scherzinger |
| 2010/0171377 A1 | * | 7/2010 | Aicher ................... G01C 21/18 310/38 |
| 2010/0172546 A1 | | 7/2010 | Sharp |
| 2010/0174507 A1 | | 7/2010 | Vogel et al. |
| 2011/0007154 A1 | * | 1/2011 | Vogel ......................... G01C 1/04 348/142 |
| 2011/0043620 A1 | * | 2/2011 | Svanholm ................. G01C 1/04 348/135 |
| 2012/0057174 A1 | * | 3/2012 | Briggs .................. G01C 15/002 356/603 |
| 2012/0062868 A1 | * | 3/2012 | Kludas et al. ................. 356/4.01 |
| 2012/0230668 A1 | * | 9/2012 | Vogt ....................... G03B 17/561 396/428 |
| 2013/0197852 A1 | * | 8/2013 | Grau et al. ..................... 702/123 |

FOREIGN PATENT DOCUMENTS

| | | |
|---|---|---|
| DE | 144 967 | 11/1980 |
| DE | 19922321 C2 | 7/2002 |
| DE | 10 2007 030 784 A1 | 1/2008 |
| EP | 0 971 207 A1 | 1/2000 |
| EP | 0 997 704 A1 | 5/2000 |
| EP | 1 139 062 A1 | 10/2001 |
| EP | 1 607 718 A2 | 12/2005 |
| EP | 1 655 573 A1 | 5/2006 |
| EP | 1936323 A2 | 6/2008 |
| EP | 1944572 A1 | 7/2008 |
| JP | 4 98809 A | 7/1992 |
| JP | 2000-131060 A | 5/2000 |
| JP | 2005-0172262 A | 1/2005 |
| JP | 2007-147422 A | 6/2007 |
| WO | 2004/057269 A1 | 7/2004 |
| WO | 2005/059473 | 6/2005 |
| WO | 2007/031248 A2 | 3/2007 |
| WO | 2009/100728 A1 | 8/2009 |
| WO | 2009/100773 A1 | 8/2009 |
| WO | 2009/100774 A1 | 8/2009 |
| WO | 2009/103342 A1 | 8/2009 |
| WO | 2009/106141 A1 | 9/2009 |
| WO | 2010/080950 A1 | 7/2010 |

OTHER PUBLICATIONS

Zhang et al., "Photo Total Station System an Integration of Metric Digital Camera and Total Station" Conference on Optical 3-D Measurement Techniques (vol. 1, pp. 176-182) Sep. 22, 2003.

Zhang, "Determining the Epipolar Geometry and its Uncertainty: A Review" International Journal of Computer Vision 27 (2) 161-198, 1998.

Office Action of Feb. 26, 2013 for U.S. Appl. No. 12/735,279, 37 pages.

Office Action of Mar. 21, 2013 for U.S. Appl. No. 12/735,582, 25 pages.

Non-Final Office Action of Mar. 12, 2012 for U.S. Appl. No. 12/363,693, 17 pages.

Final Office Action of Sep. 9, 2012 for U.S. Appl. No. 12/363,693, 15 pages.

Non-Final Office Action of Aug. 16, 2013 for U.S. Appl. No. 12/363,693, 12, pages.

Non-Final Office Action of Nov. 13, 2013 for U.S. Appl. No. 12/735,805, 29 pages.

Final Office Action of Mar. 26, 2014 for U.S. Appl. No. 12/735,805, 32 pages.

Final Office Action of May 16, 2014 for U.S. Appl. No. 12/363,693, 15 pages.

Notice of Allowance of Jul. 24, 2014 for U.S. Appl. No. 12/363,693, 15 pages.

Notice of Allowance of Jul. 17, 2015 for U.S. Appl. No. 12/735,805, 8 pages.

* cited by examiner

STEREO PHOTOGRAMMETRY FROM A SINGLE STATION USING A SURVEYING INSTRUMENT WITH AN ECCENTRIC CAMERA

CROSS-REFERENCES TO RELATED APPLICATIONS

This application is a continuation of U.S. patent application Ser. No. 12/363,693, filed Jan. 30, 2009, which is a non-provisional application of and claims the benefit of U.S. Provisional Application No. 61/143,357, filed on Jan. 8, 2009, both of which are herein incorporated by reference in their entirety for all purposes.

U.S. patent application Ser. No. 12/363,693 is a continuation-in-part of commonly-owned, PCT Patent Application No. PCT/EP2008/052531, filed Feb. 29, 2008, entitled "DETERMINING COORDINATES OF A TARGET IN RELATION TO A SURVEY INSTRUMENT HAVING AT LEAST TWO CAMERAS," the entire disclosure of which is hereby incorporated by reference. U.S. patent application Ser. No. 12/363,693 is also a continuation-in-part of commonly-owned, PCT Patent Application No. PCT/EP2008/058183, filed Feb. 12, 2008, entitled "DETERMINING COORDINATES OF A TARGET IN RELATION TO A SURVEY INSTRUMENT HAVING A CAMERA," the entire disclosure of which is hereby incorporated by reference.

BACKGROUND OF THE INVENTION

Photogrammetry is the science of making measurements from photographs. Surveying is the technique and science of accurately determining the terrestrial or three-dimensional space position of points and the distances and angles between them. These points are usually, but not exclusively, associated with positions on the surface of the Earth, and are often used to establish land maps and boundaries for ownership or governmental purposes. Photogrammetry has been used in surveying for a long time and provides a accurate measurement technique for both land based and aerial surveying.

Stereophotogrammetry makes it possible to determine the three-dimensional coordinates of points on an object. These are determined by measurements made in two or more photographic images taken from different positions. Common points are identified on each image. A line of sight can be constructed from the camera location to the point on the object. It is the intersection of these rays that determines the three-dimensional location of the point.

The use of a camera in a surveying instrument, for example, a Total Station, may provide for improved user convenience and new functions. Particularly, a view such as an image or a video feed provided by the camera and shown on a display of the instrument may be used for assisting target selection and for providing the user with an overview of potential points of interest. For a general background of total stations comprising a camera for capturing an image or a video feed of the view towards which the total station is aimed, reference is made to PCT/EP2004/014365 which is incorporated herein in its entirety.

Despite the advances made in surveying instruments, a need exists in the art for methods and systems for performing stereo photogrammetry using surveying.

SUMMARY OF THE INVENTION

The present invention relates to surveying instruments, such as Total Stations. More particularly, the present invention relates to a method for determining coordinates of a target in relation to a surveying instrument having a camera for capturing a field of view and an identified target point within the field of view. In a particular embodiment, a method is provided for determining, in relation to a surveying instrument, target coordinates of a point of interest (i.e., a target) identified in two images captured by a camera included as part of the surveying instrument. However, embodiments of the present invention have a broader applicability, for example, in the fields of engineering, industrial metrology, archeology and forensics.

According to an embodiment of the present invention, a method for determining coordinates of a target in relation to a surveying instrument having a horizontal axis and a vertical axis is provided. The method includes determining coordinates of the surveying instrument using signals from one or more Global Navigation Satellite System (GNSS) signals. The surveying instrument includes a camera positioned eccentric to a rotation center of the surveying instrument. The method also includes positioning the camera in a first camera position and orientation, capturing a first image using the camera in the first camera position and orientation, identifying, in the first image, an object point associated with the target, and measuring first image coordinates of the object point in the first image. The method further includes rotating the surveying instrument around the horizontal axis and the vertical axis in order to position the camera in a second camera position and orientation, capturing a second image using the camera in the second camera position and orientation, identifying, in the second image, the object point identified in the first image, and measuring second image coordinates of the object point in the second image. The method additionally includes determining the coordinates of the target in relation to the surveying instrument based on the coordinates of the surveying instrument, the first image coordinates, and the second image coordinates.

According to another embodiment of the present invention, a system for determining coordinates of a target is provided. The system includes a surveying instrument adapted to capture images and associated image information of a target location. The surveying instrument includes a rotation center, a camera located eccentric to the rotation center, and a GNSS module configured to receive one or more GNSS signals. The surveying instrument also includes a display device configured to display the captured images, the associated image information, and the target coordinates information and an input device adapted to receive information identifying an object point. The system also includes a memory device coupled to the surveying instrument and configured to store the captured images and the associated image information. The system further includes a CPU coupled to the surveying instrument and configured to accept the associated image information from the surveying instrument and calculate coordinates of the object point identified in the captured images.

According to an alternative embodiment of the present invention, a computer readable storage medium is provided. The computer readable medium is coupled to a surveying instrument containing instructions, which when executed, cause a CPU to locate the coordinates of the surveying instrument using one or more GNSS signals, identify an object point in a first image recorded by the surveying instrument, and measure first image coordinates of the object point in the first image. The computer readable medium also contains instructions, which when executed, cause the CPU to identify, in a second image recorded by the surveying instrument, the object point identified in the first image, measure second image coordinates of the object point in the second image, and calculate coordinates of the object point relative to the location of the surveying instrument based on the coordinates of the surveying instrument, the first image coordinates, and the second image coordinates.

In addition, the present invention can be implemented in a computer program that, when executed, performs the inventive method in a surveying instrument. The computer program may, for example, be provided in the surveying instrument as sold or downloaded into the surveying instrument as an upgrade. As will be understood, the inventive method can be implemented for surveying instrument using software, hardware, firmware, or a combination thereof, as desired in view of the particular circumstances.

Numerous benefits are achieved using the present invention over conventional photogrammetric technique of capturing images from different instrument locations. For example, an embodiment provides a highly accurate method for determining coordinates of an object point at a close range using a single camera. The embodiments described herein simplify the image capture process since only a single camera is used in the setup. In addition, the baseline for the surveying instrument is short and is known from factory calibration. This reduces occlusion problems and eliminates the need for measurement of the baseline in the field. The methods described herein are well suited for stereophotogrammetry applications for short distances. In addition, the short baseline simplifies the matching of the two images since there is minimal change in the viewpoint between the two images captured by the camera. Another advantage of one of the embodiments of the present invention is that since there is relatively short time interval between the capture of the two images, potential errors introduced by external variables, for example, lighting conditions, can be greatly reduced or in some instances eliminated. Moreover, embodiments of the present invention utilize a single camera rather than two cameras, thereby reducing system cost. Additionally, measurements can be made from a single location without moving the instrument, decreasing the time used in performing a survey. Depending upon the embodiment, one or more of these benefits may exist. These and other benefits have been described throughout the present specification and more particularly below.

DETAILED DESCRIPTION OF SPECIFIC EMBODIMENTS

Figure 1:
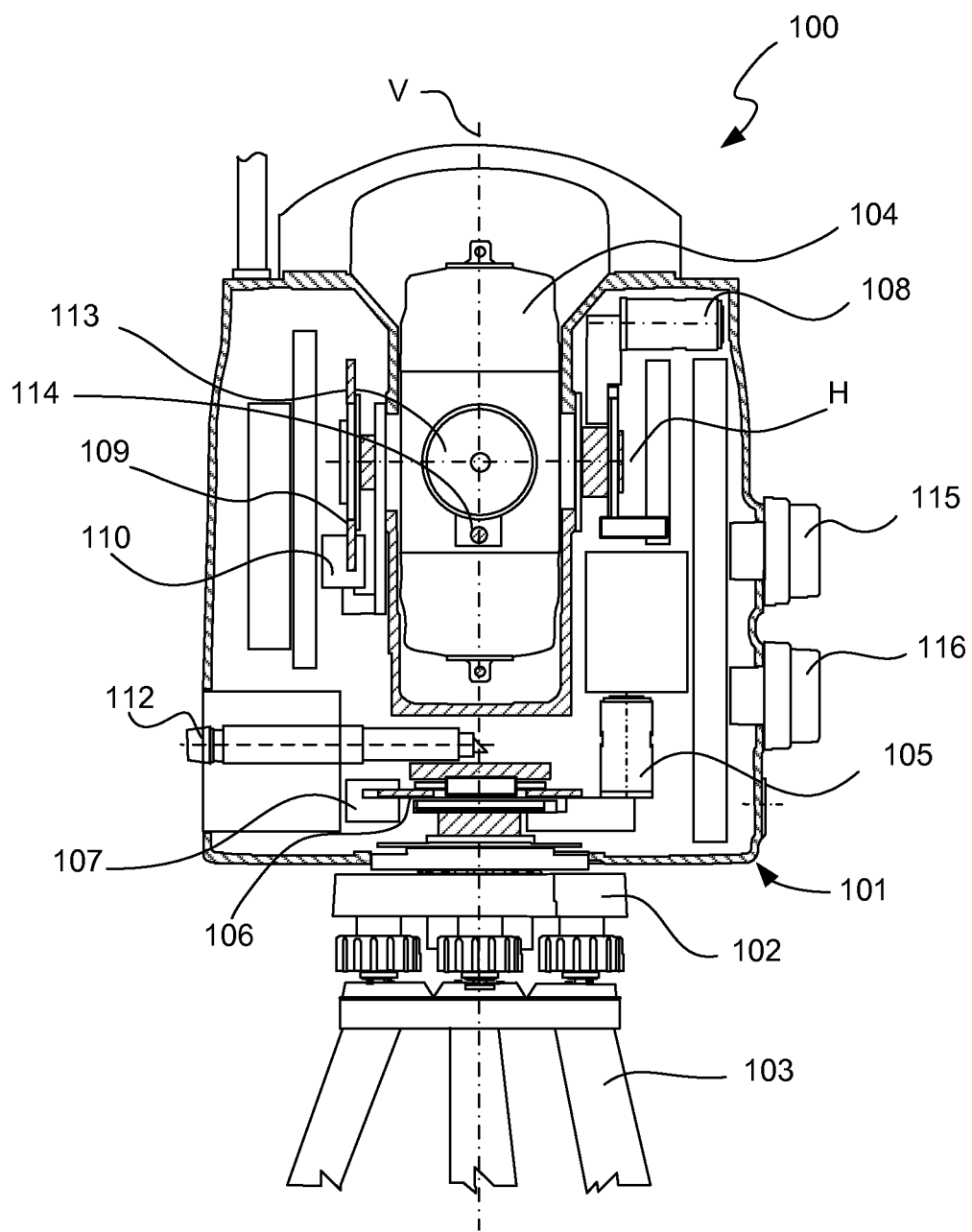
FIG. 1 illustrates a schematic diagram of a surveying instrument according to one embodiment of the invention.

FIG. 1 shows a schematic diagram of a surveying instrument that may be used to implement the method according to one embodiment of the present invention. The surveying instrument 100 comprises an alidade 101 mounted on a base 102, and has a mounting support structure in the form of a tripod 103. The alidade 101 can be rotated about a vertically oriented rotation axis V, in order to aim the instrument in any desired horizontal direction. In the alidade, there is a center unit 104, which can be rotated about a horizontally oriented rotation axis H, in order to aim the instrument in any desired vertical direction. Measurements made using the surveying instrument 100 are typically related to an origin of coordinates located at the intersection between the vertically oriented and the horizontally oriented rotation axes V and H.

A drive mechanism 105 is provided for rotating the alidade about the vertically oriented rotation axis in order to aim the instrument in any desired horizontal direction. The rotational position of the alidade 101 is tracked by means of a graduated disc 106 and a corresponding angle encoder or sensor 107. For rotation of the center unit 104 about the horizontally oriented rotation axis H, a similar drive mechanism 108, graduated disc 109 and sensor 110 are provided. Moreover, the instrument has an optical plummet 112, which gives a downwards view along the vertically oriented rotation axis V. The optical plummet is used by the operator to center or position the instrument above any desired point on the ground.

The instrument line of sight is centered at the intersection between the vertical and the horizontal rotation axes, and this can be seen in the figure where these axes cross in the center of a telescope 113 in the center unit 104.

A camera 114 is provided below the telescope in the center unit for capturing an image or a video feed generally in the direction of the instrument line of sight. The camera 114 is eccentric from the center of the telescope 113. In the embodiment illustrated in FIG. 1, the camera 114 is mounted on the housing of the surveying instrument a predetermined distance below the center of rotation, which is positioned on the axis passing through the center of the telescope 113 and lying perpendicular to the axes V and H. Since the center of rotation is located at a position inside the housing of the surveying instrument, the camera 114 illustrated in FIG. 1 is eccentric in a dimension measured along the V axis and the axis perpendicular to the V and H axes. In other embodiments, the camera may be mounted at other locations on or inside the housing 104. As described more fully in relation to FIG. 4 below, the camera is characterized by a longitudinal dimension separating the image sensor and the optics. In addition, the camera optics are separated from the rotation center of the surveying instrument by a vertical and a horizontal distance.

The instrument 100 also comprises a display device for showing the image captured by the camera. The display may be an integral part of the instrument or may be included in a removable control panel that can be used for remote control of the instrument via short range radio. Some surveying instruments sold by the present assignee, for example, the Trimble VX Spatial Station, are fully remote controlled, wherein the display may be in the form of a computer screen located far away from the surveying instrument and information to and from the instrument to the computer is transferred over a wireless medium or a radio telephone network. In addition, the surveying instrument may be equipped with a GNSS capability to enable the instrument to locate its position in 3-D coordinates.

Alternatively, the instrument can also be manually operated for aiming towards a desired target using vertical and horizontal motion servo knobs 115 and 116. The camera of the instrument is operable to capture images from different positions and orientations eccentric to a rotation center of the surveying instrument.

The surveying instrument also comprises a CPU and associated firmware (not shown) that is capable of performing various measurements. Some of the tasks that the CPU is capable of performing are identifying an object point corresponding to a selected target in the displayed image, determining, based on the position of the object point in the displayed images directions towards the target from the camera in the different positions measuring image coordinates of the object point in the displayed images, and determining target coordinates of the target in relation to the rotation center of the surveying instrument, based on the first camera position and orientation, the first image coordinates, the second camera position and orientation, the second image coordinates, and camera calibration data.

To identify the object point in the captured image, a cursor may be provided that can be moved across the display. Alternatively, the display may be a touch display, where the object point is identified by simply clicking or tapping on the display.

The identification of the object point may include additional functionality implemented in the form of image processing software. The additional functionality may have the capability to locate the object points based on certain features in the captured image, for example, markers or patterns located at the desired target. Further, an object point identified in a first image may be automatically identified in a second image based on patterns identified in the first image. The user may then be given the option to confirm that the identified object point is correct. This confirmation may be sought before or during the aiming and measuring procedures.

A computer program code implemented in the CPU can then be used to measure the image coordinates of the object point in the displayed images and determine the target coordinates of the target in relation to the rotation center of the surveying instrument. However, implementation may also be made using dedicated hardware, such as a special purpose microprocessor or a digital signal processor (DSP), firmware, or similar.

Figure 2:
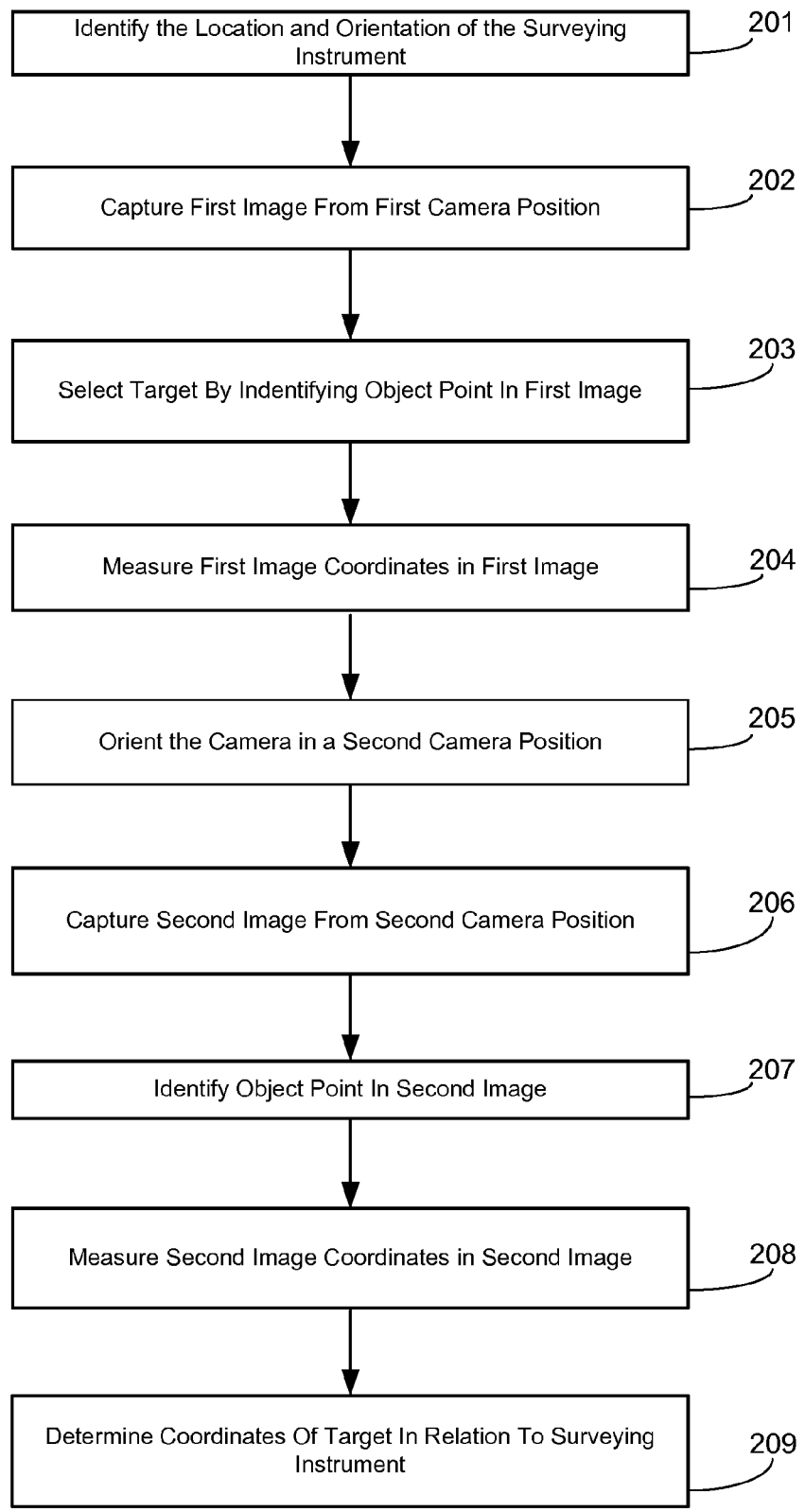
FIG. 2 a simplified flowchart illustrating a method of measuring the coordinates of a target according to an embodiment of the present invention.

FIG. 2 is a simplified flowchart illustrating a method of measuring the coordinates of a target according to an embodiment of the present invention. This diagram is merely an example, which should not be construed to unduly limit the scope of the claims herein.

Before beginning the surveying process, the location and orientation of the surveying instrument is determined in step 201. The use of signals from one or more GNSS provides a convenient means for determining the location and/or orientation of the surveying instrument within a global coordinate system. This location is registered in a memory device that may be either internal or external to the surveying instrument. In a particular embodiment, the location of the surveying instrument is measured in GNSS coordinates. The GNSS coordinates are generally expressed in terms of latitude and longitude, but can be expressed in several other coordinate systems depending on the embodiment. Combining GPS or other GNSS techniques with conventional measurements, either optical, gyroscope-based, or the like, is sometimes referred to as Integrated Surveying. Although GNSS signals, for example, GPS signals, are utilized in some embodiments, other applications utilize only conventional surveying systems and methods. Thus, in applications that are indoors or underground, non-GNSS surveying methods can be utilized to provide data not available using satellite-based systems. Conventional surveying systems can be implemented in local coordinate systems in addition to, or in place of, global coordinate systems. In other cases, conventional surveying systems and methods may provide greater accuracy than achievable with GNSS-only systems.

In other embodiments, the location of the surveying instrument is defined in relation to other portions of the surveying instrument as embodiments are not limited to reference to the center of rotations. Moreover, embodiments of the present invention are not limited to defining location in terms of GNSS coordinates, but other coordinate systems could be used. In a particular implementation, there are (at least) three coordinate systems of interest. The camera coordinate system, with the origin at the center of projection, and axes aligned with and perpendicular to the optical axis; the instrument coordinate system, with the origin at the center of rotation of the instrument, and axes as illustrated in FIG. 1; and the "world" coordinate system, which may be a global system, determined using GNSS, or may be a local system. In simple cases, the world coordinate system be equivalent to the instrument coordinate system.

The camera coordinate system in this particular implementation, is related to the instrument coordinate system by the camera calibration, and the current H and V angle at which the instrument is pointing. The instrument coordinate system is related to the world coordinate system by the location and orientation determined during the station setup. The relationships between these coordinate systems can be expressed by rotation and transformation matrices. These matrices can be combined so that we can also determine the relationship between the camera coordinate system and the world coordinate system. One of ordinary skill in the art would recognize many variations, modifications, and alternatives.

In step 202, the surveying instrument is positioned in a manner which results in the camera being brought into a first position such that the instruments line of sight is aimed in the direction of a target. For example, the first camera position could be when the camera is located below the telescope 113 as illustrated in FIG. 3B. For purposes of clarity, the position of the camera is typically defined in terms of an {x,y,z} coordinate in a three-dimensional space. This position of the camera may be referenced to the location of the surveying instrument, for example, the position of the center of rotation of the surveying instrument. Alternatively, the position of the camera may be defined by the GNSS coordinates, which may be computed based on the GNSS coordinates of the center of rotation and the geometry of the surveying instrument.

The orientation of the camera in the first position is typically referenced to the line of sight of the surveying instrument. The line of sight of the instrument is typically perpendicular to the housing 104 and pointing in the direction of the image to be captured.

After a first image is captured, the user or the instrument can select a target within the captured first image by identifying an object point in the image. This object point will serve as the means for determining the coordinates of the target. This selection of an object point is illustrated in step 203. In one embodiment, the object point is identified by selecting certain pixels in the captured image. Then the coordinates of that object point in the first image are measured by the instrument in step 204. This information may also be stored in a memory device described above. In step 205 the surveying instrument is rotated along its horizontal (H) axis and its Vertical (V) axis such that the camera is oriented in a second position. The rotation around its center axes results in the line of sight being aimed again at the target. This second position could be, for example, when the camera is positioned above the telescope 113. In one embodiment, the surveying instrument is first rotated along its vertical axis and then rotated along its horizontal axis.

It should be noted that rotating the surveying instrument around the horizontal axis and the vertical axis in order to position the camera in a second camera position and orientation typically includes a rotation by exactly 180° about both the horizontal and vertical axes so that the optical axes for the two images are substantially parallel. It should be noted that for close range work, the instrument may be rotated such that the optical axes for the two images are convergent on the object of interest.

The camera then captures a second image in step 206. Next, the same object point that was identified in the first image is located in the second image in step 207. Then, in step 208, the image coordinates of the object point located in the second image are measured. The second image coordinates information is stored in the memory device. Following this, the coordinates of the target, relative to the instrument, are calculated using the instrument and location information, the first camera position and orientation, the first image coordinates the second camera position and orientation and the second image coordinates. In one embodiment, the coordinates of the target are calculated using an external device that receives inputs from the surveying instrument relating to the first image coordinates, the second image coordinates and location information of the surveying instrument. Alternatively, the surveying instrument can be adapted to perform the calculation of the target point coordinates.

It should be appreciated that the specific steps illustrated in FIG. 2 provide a particular method of calculating the coordinates of a target according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple substeps that may be performed in various sequences as appropriate to the individual step. Furthermore, additional steps may be added or removed depending on the particular applications. One of ordinary skill in the art would recognize many variations, modifications, and alternatives.

Figure 3A:
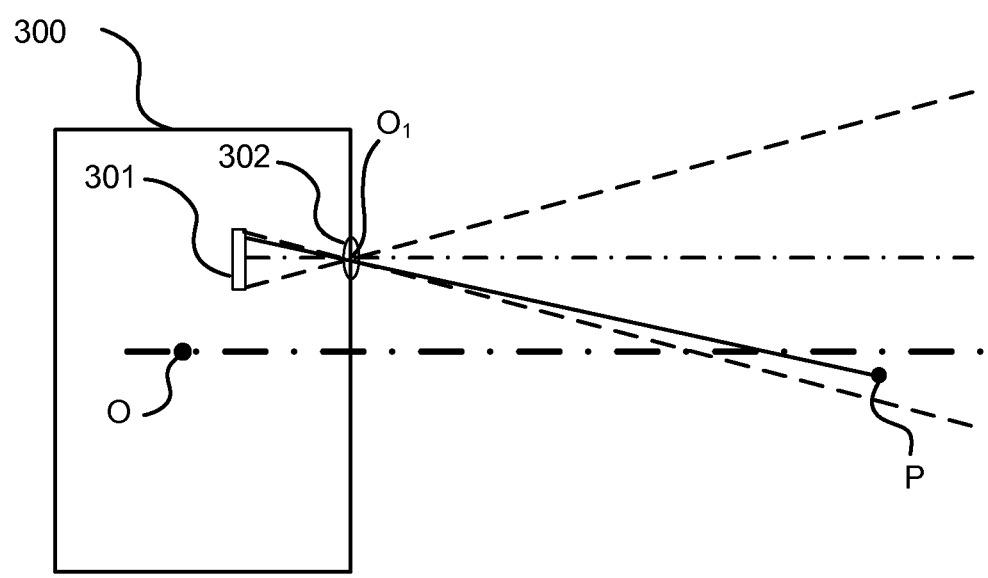
FIG. 3A is a schematic diagram illustrating image capture from a first camera position according to one embodiment of the invention.
Figure 3B:
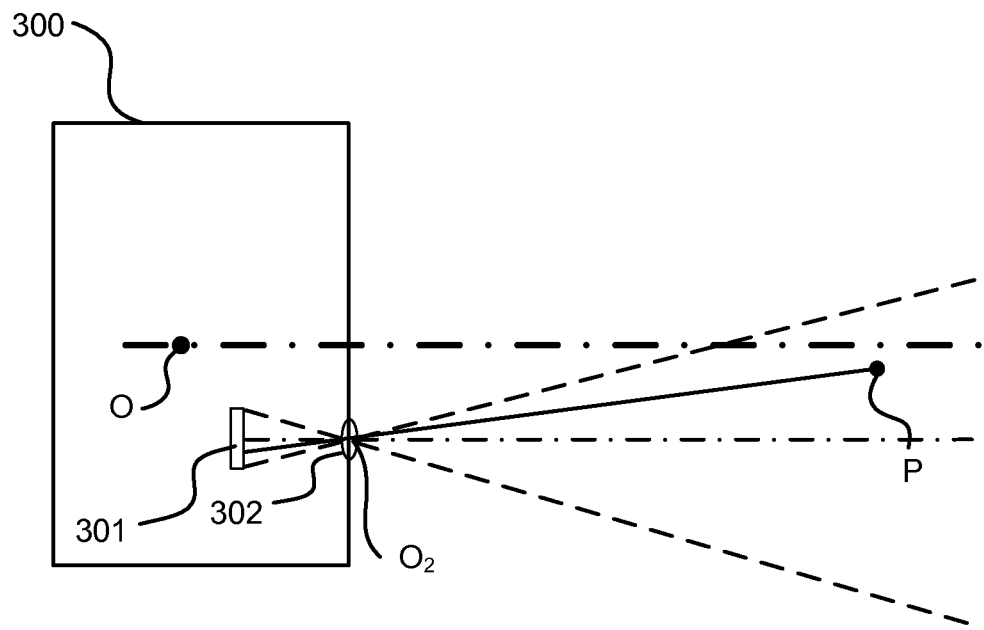
FIG. 3B is a schematic diagram illustrating image capture from a second camera position according to one embodiment of the invention.

FIGS. 3A and 3B illustrate implementation of a method of determining coordinates of a target according to one embodiment of the present invention. FIG. 3A illustrates the measurements taken in the first camera position. The surveying instrument 300 comprises a camera 301 with associated optics 302. The camera 301 has a camera center, or projection center $O_1$ that is eccentric to the rotation center O of the surveying instrument 300. This is the first camera position. The camera may further be moved to different positions by rotation of the surveying instrument 300 around its rotation center. It is to be noted that although the camera is shown as being above the line of sight of the instrument 300, it can have any arbitrary location that is eccentric to the rotation center O of the instrument. A first image is captured by the camera 301 in the first position $O_1$. The position $O_1$ is eccentric to the instrument rotation center O. A target is selected by identifying an object point P at a position $P_1$ in the first image.

Once the target has been selected by identification of the object point P in the first image, first image coordinates of the object point P in the first image at location $P_1$ are measured.

The surveying instrument is then rotated around its vertical and horizontal axis to bring the camera 300 in a second position and orientation $O_2$ as depicted in FIG. 3B. A second image is taken in this camera position and orientation. The object point identified in the first image is again identified in the second image at a position $P_2$. Once the object point P has been identified in the second image, the second image coordinates of the object point in position $P_2$ in the second image are measured.

The information regarding the image coordinates of the object point P in the first image and the second image is stored in a memory and then subsequently used by the CPU to calculate the coordinates of the object point P in relation to the surveying instrument. Although a specific embodiment for calculating coordinates of a target location is described above, it should be noted that the following general principles of Photogrammetry are incorporated in the embodiment discussed above. These basic principles are discussed below for clarity.

Figure 4:
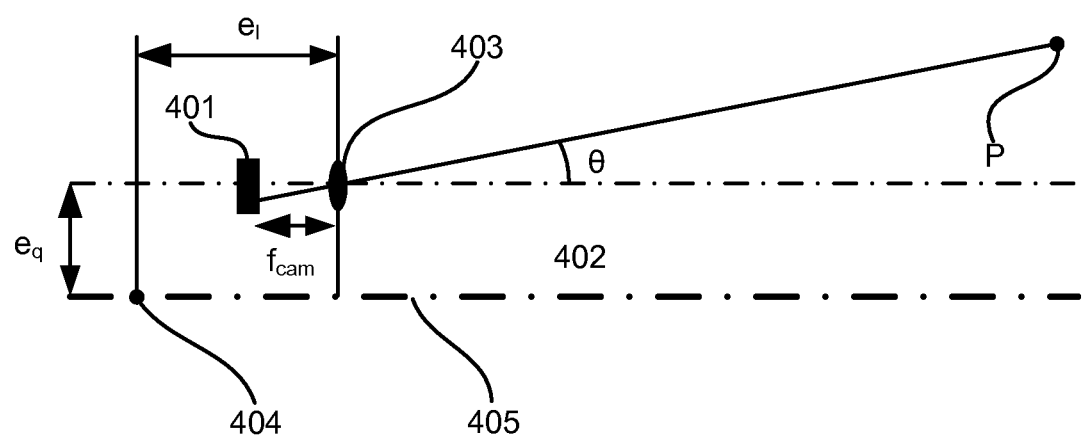
FIG. 4 illustrates a surveying instrument with the camera in an eccentric position.

FIG. 4 illustrates a surveying instrument with the camera in an eccentric position. As illustrated in FIG. 4, an object point P in an image, captured by a surveying instrument, is identified. The surveying instrument has a camera, which has a camera sensor 401. The camera sensor could be either CMOS or CCD and is adapted to capture an image centered about a camera axis 402. An image is formed on the camera sensor 401 by means of an optical system 403. The surveying instrument can be aimed at a desired target by rotation over horizontal and vertical angles about a rotation center 404, as discussed above, of the instrument. As illustrated in FIG. 4, the optical system 403 for the camera is eccentric with respect to the rotation center of the instrument. The eccentricity is measured in terms of distances $e_q$ and $e_t$, respectively, from the rotation center 404 of the instrument. The camera axis 402 (center-line for the camera view) is thus not co-linear with the optical axis 405 of the instrument (i.e. optical line of sight), as illustrated in the figure. The camera optical axis 402 should ideally be perpendicular to the plane of the camera sensor 401 and the optical system 403 should be free from distortions or aberrations. In some system designs, lens distortion and/or aberrations are modeled to account for system distortion and aberrations.

Figure 6:
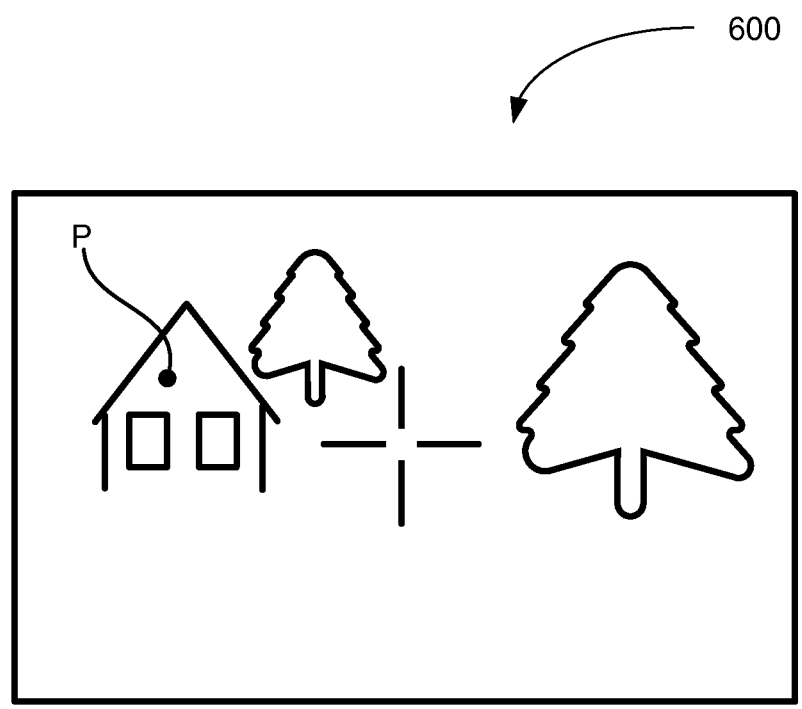
FIG. 6 is a schematic representation of an image or video frame that may be captured by the camera.

FIG. 6 schematically shows a sample image captured by the camera. The image may be displayed on the display device of the surveying instrument. In one embodiment, a user may select the image object point of a target P by clicking in the image or otherwise indicating the desired object point. Alternatively, the identification of the object point in the image can be accomplished by using a predetermined criteria and by use of an automated program. The optical axis (i.e. the optical line of sight) of the instrument is directed roughly towards the image center, which is indicated by the cross-hair in FIG. 6.

In order to identify an object point in the captured image, it is useful to determine the direction of the target P from the surveying instrument. Various methods to accomplish this can be implemented. In one embodiment, if the direction to the target P from the camera is expressed as horizontal and vertical angles $(\theta_x, \theta_y)$ from the camera axis 402, the surveying instrument determines the direction to the target P from the camera by calculating the horizontal and the vertical angles $(\theta_x, \theta_y)$ based on pixel coordinates in the image or video feed captured by the camera. Hence, the function f that calculates the horizontal and vertical angles $(\theta_x, \theta_y)$ based on image pixels can be described as:

$$(\theta_x, \theta_y) = f(x, y, C),$$

where x and y are the pixel coordinates of the desired target in the coordinate system of the camera, and C comprises calibration factors to be determined for each system. The calibration factors C include details about the camera, such as but not limited to, its eccentricity $e_q$ and $e_l$ and its focal length $f_{cam}$ as illustrated in FIG. 4.

In an embodiment, the camera calibration consists of a set of three rotations of the camera relative to the instrument (these rotations will be small, due to manufacturing tolerances), three translations relative to the instrument ($e_q$ and $e_l$ are illustrated in FIG. 4, there will also be $e_r$, (not shown) which is a small manufacturing tolerance in the illustrated embodiment, but could be large in a different embodiment if the camera is not located directly under the EDM), the focal length and pixel dimensions, and the distortion parameters. Additional description related to these parameters is provided in commonly assigned International Patent Application No. PCT/EP2004/014365, the disclosure of which is hereby incorporated by reference in its entirety.

Figure 5:
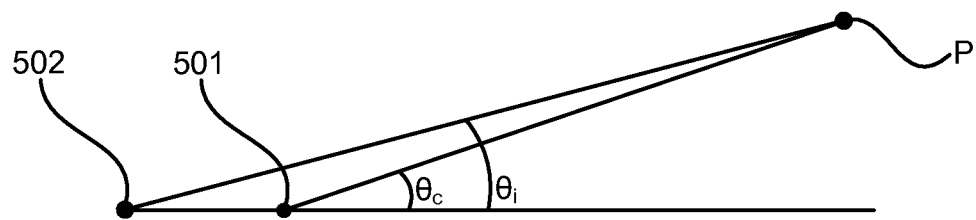
FIG. 5 is a schematic illustrating the angle differences relative to an object point due to the eccentricity between the camera and the instrument.

In order to find the direction, it is also beneficial to determine the distance of the target point P from the camera. FIG. 5 shows a schematic view of the method used to find the distance of the object point P from the camera 501 when only one image of the target is acquired. As illustrated in FIG. 5, the angles between the current line of sight and the desired target (P) for both the camera 501 and the instrument rotation center 502 are measured. The camera calibration data, discussed above, is used to determine the camera angle $\theta_c$ to the object point P, but the instrument angle $\theta_i$ to the object point P will be slightly different as indicated. Hence, in order to find the direction to a target from an instrument using one image, e.g. for aiming the instrument towards the desired object point P, it is necessary to know the distance to the target. However, when using two images to determine the image co-ordinates of the object point P, the process is simplified.

Figure 7:
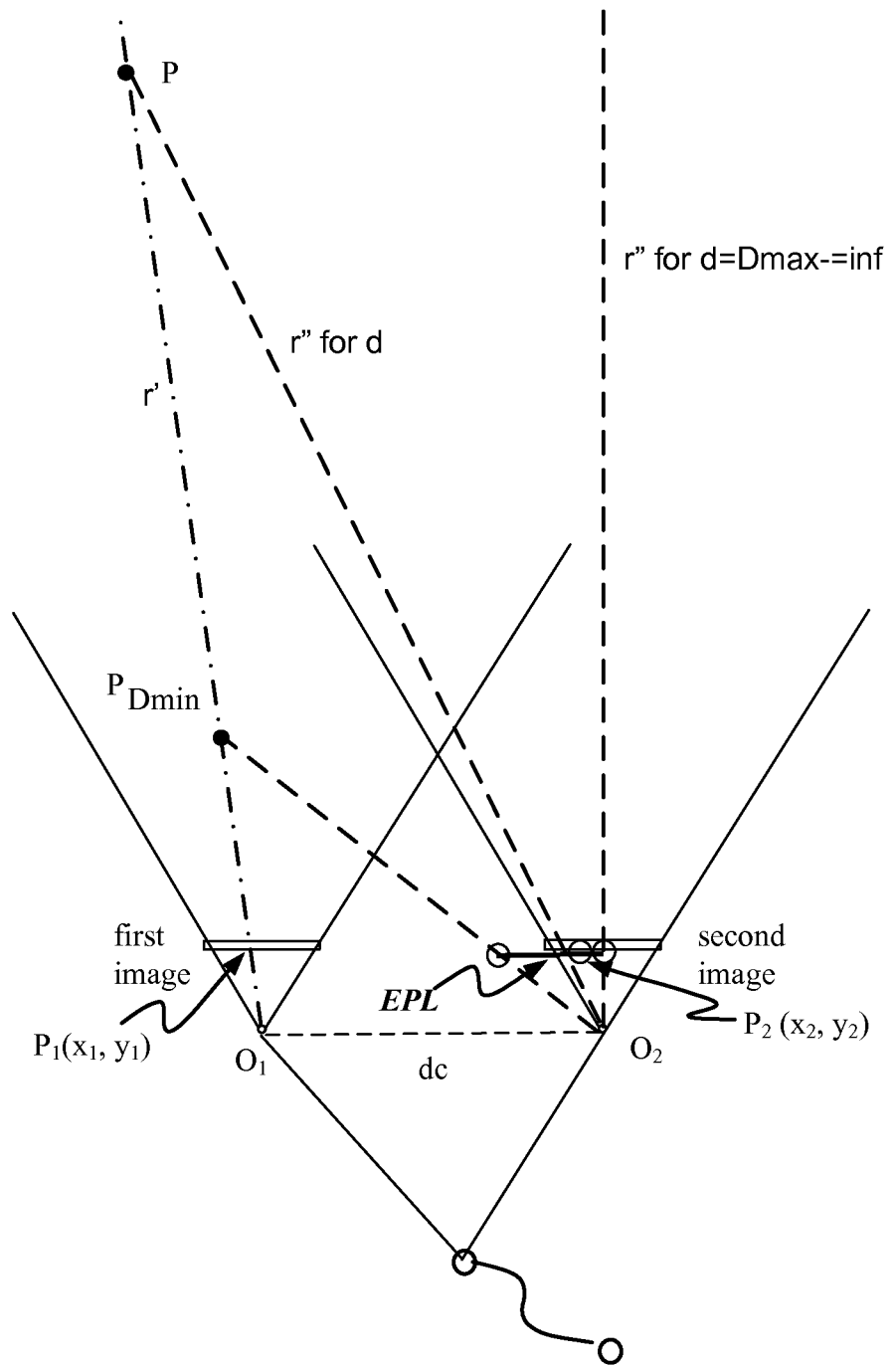
FIG. 7 is a schematic illustrating capturing of two images from a camera and identification of an object point in the second image.

FIG. 7 is an illustration of capturing two images from the camera and identifying an object point in those images. The rotation center of the surveying instrument is depicted by location O. The camera positions while capturing the first and second images is depicted by locations $O_1$ and $O_2$, respectively. A first image is captured by the camera when the camera is located in a first position and orientation $O_1$, eccentric to the rotation center O of the surveying instrument. A target in position P is selected by identifying an object point in a position $P_1(x_1, y_1)$ in the first image. The surveying instrument is then rotated around its rotation center as described earlier to bring the camera in a second position and orientation $O_2$. The distance between the first and second camera position is denoted by dc. It should be noted that the baseline dc is known from the camera calibration. If we ignore the other camera calibration parameters, $dc=2e_q$. The camera in this location captures a second image. The object point identified in the first image is now identified in the second image in location $P_2(x_2, y_2)$. Next, collinearity equations are used to determine the coordinated of the point P based on the image coordinates of $P_1$ and $P_2$. For a general discussion of the collinearity equations and camera calibration, reference is made to International Patent Application No. PCT/EP2004/014365, referenced above.

The measured coordinates of $P_1$ in the first image can be represented by the following equations:

$$x1 = x_0 - c_K \frac{r_{11'}(X-X_{0'}) + r_{21'}(Y-Y_{0'}) + r_{31'}(Z-Z_{0'})}{r_{13'}(X-X_{0'}) + r_{23'}(Y-Y_{0'}) + r_{33'}(Z-Z_{0'})} + \Delta x$$

and $$y1 = y_0 - c_K \frac{r_{12'}(X-X_{0'}) + r_{22'}(Y-Y_{0'}) + r_{32'}(Z-Z_{0'})}{r_{13'}(X-X_{0'}) + r_{23'}(Y-Y_{0'}) + r_{33'}(Z-Z_{0'})} + \Delta x.$$

The measured coordinates of point $P_2$ in the second image can be represented by the following equations:

$$x2 = x_0 - c_K \frac{r_{11''}(X-X_{0''}) + r_{21''}(Y-Y_{0''}) + r_{31''}(Z-Z_{0''})}{r_{13''}(X-X_{0''}) + r_{23''}(Y-Y_{0''}) + r_{33''}(Z-Z_{0''})} + \Delta x$$

and $$y2 = y_0 - c_K \frac{r_{12''}(X-X_{0''}) + r_{22''}(Y-Y_{0''}) + r_{32''}(Z-Z_{0''})}{r_{13''}(X-X_{0''}) + r_{23''}(Y-Y_{0''}) + r_{33''}(Z-Z_{0''})} + \Delta y.$$

The following parameters in the equations above are known from calibration data.

$X_0$; $Y_0$; $Z_0$: coordinates from camera position, '=first image; ''=second image.

$r_{ij}$: elements from rotation matrix (i=1 . . . 3; j=1 . . . 3), '=first image; ''=second image.

$x_0$; $y_0$: coordinates from the principle point (constant, independent of camera position)

$c_K$: camera constant (constant, independent of camera position)

$\Delta x$, $\Delta y$: parameter of distortion. The distortion is a polynomial of a higher degree. The distortion depends of the image position and is independent of the camera position.

All parameters in the above equations are measured or known from camera calibration except for X, Y, and Z. These are the coordinates of the object point P. It should be noted, however that the above illustration is provided merely to describe one method of determining the location of object point P. It is not necessary to have only two images to implement this method. One skilled in the art can easily adapt the same method described above to determine the coordinates of the object point P using more than two images, in which case the parameters X, Y, and Z can be determined by, for example, using a least square method.

Once the target has been selected by identification of the object point in the first image, a first direction r' to the target from the first position $O_1$ of the camera center can determined. Using this first direction r' together with a maximum distance $D_{max}$ (which may be selected as infinity), and a minimum distance $D_{min}$ (which may be selected as the minimum distance of the surveying instrument) along the direction r', a section of r' can then be transformed into a section of a so called epipolar line el'' in the second image on which the object point should be located in the second image. Hence, if a pattern has been recognized in the first image around the position $P_1$ of the object point in the first image, this pattern may be recognized in the second image, e.g. by means of automatic image processing, by searching along the section of the epipolar line in the second image or in an area around that section. In an alternative embodiment, a graphical indication of the section of the epipolar line in the second image may be presented to an operator. The operator can then identify the target in the second image using this information. It should be noted that a benefit provided by embodiments of the present invention is that the systems and method described herein can be used at a closer range than can typically be measured using an EDM unit. Thus, in some embodiments, $D_{min}$ is the distance at which a point in one image is no longer visible in the second image.

Figure 8:
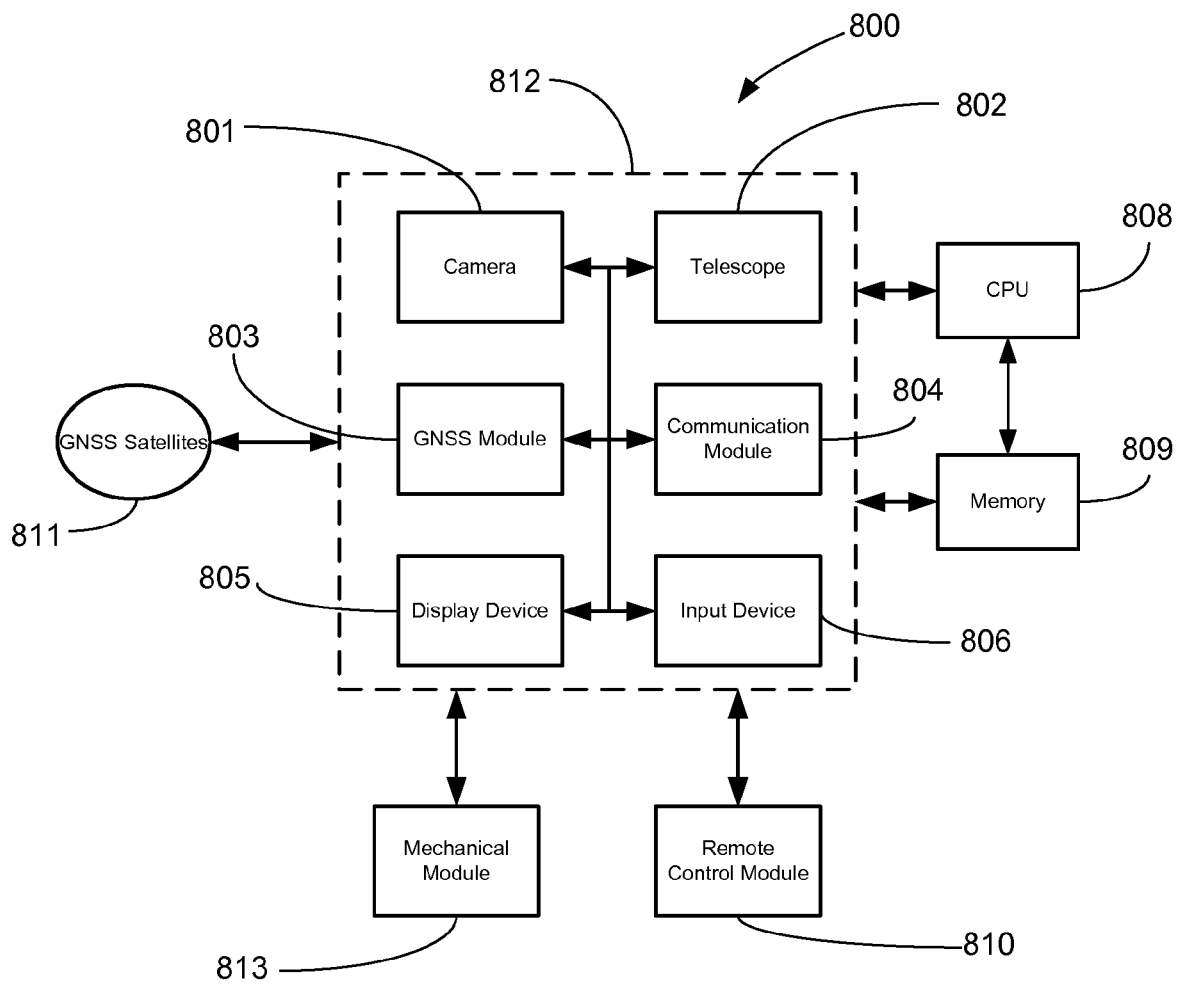
FIG. 8 is a block diagram of a system adapted to implement the embodiments of the present invention.

FIG. 8 shows a block diagram of a system 800 implemented to calculate the coordinates of the object point P in relation to the surveying instrument 812. The surveying instrument 812 comprises a camera 801, a telescope 802, a GNSS module 803, a communications module 804, a display device 805 and an input device 806. The GNSS module 803 is configured to receive signals from the GNSS satellites 811 in order to determine the location of the surveying instrument 812. Although GNSS satellites and a GNSS module are illustrated in FIG. 8, other location information is suitable for use in the methods and systems described herein. For example, Integrated Surveying systems including GPS/GNSS and other location information systems are included within the scope of the present invention. The display device 805 and the input device 806 may be combined into a single unit for display capable of accepting user input. The display 805 can be either a touch screen display or any other display capable of accepting input from the user. Alternatively, the user may provide input using a cursor displayed on the display device. In addition, the system has a CPU 808 and a memory 809 coupled to the instrument 812. The CPU and the memory can be either internal or external to the instrument 812. The CPU 808 can be a general-purpose processor, an Application Specific Integrated Circuit (ASIC), or a microcontroller. The memory 809 stores the program instructions that cause the CPU to perform the various calculations of the image coordinates described above. In the instance where the CPU and/or the memory is located external to the surveying instrument, the calculations for determining the image coordinates can be performed remotely without tying up the valuable resources of the instrument.

The surveying instrument may be coupled to a remote control module 810 adapted to control the operation of the surveying instrument 812 from a remote location thus providing additional flexibility in its operation. A mechanical module 813 coupled to the surveying instrument provides the necessary support in the operation, particularly with rotation, of the surveying instrument. The system 800, except the GNSS satellites 811, can be implemented entirely within a surveying instrument or as separate components. One skilled in the art will recognize various other combinations to implement the system.

It should be noted that while the embodiments described above disclose a method for determining the coordinates of a single target point, one skilled in the art will recognize that that the method can also be used to determine the coordinates of multiple points. These multiple points may be identified by the user, may be selected by a feature-detection algorithm such as an edge detector, or coordinates may be determined for every pixel that can be matched between the two images. It is further understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An apparatus for determining coordinates of a target, the apparatus comprising:
   a surveying instrument having a first horizontal axis extending along a line of sight that is perpendicular to both a second horizontal axis and a vertical axis, the first horizontal axis, the second horizontal axis, and the vertical axis intersecting at a rotation center of the surveying instrument;
   a camera coupled to the surveying instrument and configured to capture images, the camera having a line of sight that is substantially parallel to the line of site of the surveying instrument and having a projection center located eccentric to the rotation center of the surveying instrument;
   a display device coupled to the apparatus, the display device configured to display the images;
   an input device coupled to the apparatus, the input device configured to receive information identifying object points in the images that are associated with the target;
   a memory device communicatively coupled to at least the camera and the display device, the memory device configured to store the images; and
   a processor coupled to at least the camera, the display device, the input device, and the memory device, the processor configured to:
      direct the camera to capture a first image in a first camera position and orientation;
      determine image coordinates of a first object point in the first image, the first object point associated with the target;
      move the camera to a second position and orientation by rotating the camera by about 180° around the vertical axis and by about 180° around the second horizontal axis, wherein the rotation center of the surveying instrument is at substantially the same location at both the first camera position and orientation and the second camera position and orientation, and an optical axis of the camera at the first camera position and orientation is substantially parallel to an optical axis of the camera at the second camera position and orientation;
      direct the camera to capture a second image in the second camera position and orientation;
      determine image coordinates of a second object point in the second image, the second object point associated with the target; and
      determine coordinates of the target relative to the rotation center of the surveying instrument based on the first camera position and orientation, the first image coordinates, the second camera position and orientation, the second image coordinates, and camera calibration data.

2. The apparatus of claim 1 wherein the processor is located internal to the apparatus.

3. The apparatus of claim 1 wherein the memory device is located internal to the apparatus.

4. The apparatus of claim 1 wherein between the first camera position and orientation and the second camera position and orientation the camera is rotated by 180° around the vertical axis and 180° around the second horizontal axis.

5. The apparatus of claim 1 wherein the surveying instrument includes a telescope aligned with the line of sight of the surveying instrument.

6. The apparatus of claim 1 wherein the line of sight of the camera is parallel to the line of site of the surveying instrument.

7. The apparatus of claim 1 wherein the image coordinates of the first object point are determined in response to information received at the input device identifying the first object point in the first image.

8. The apparatus of claim 1 wherein the processor is further configured to identify the second object point in the second image using a pattern identified in the first image.

9. The apparatus of claim 1 further comprising a global navigation satellite system (GNSS) module coupled to the apparatus, the GNSS module configured to receive one or more GNSS signals for determining coordinates of the apparatus.

10. The apparatus of claim 9 wherein the processor is further configured to determine coordinates of the target using the coordinates of the apparatus.

11. An apparatus for determining coordinates of a target, the apparatus comprising:
- a surveying instrument having a first horizontal axis extending along a line of sight that is perpendicular to both a second horizontal axis and a vertical axis, the first horizontal axis, the second horizontal axis, and the vertical axis intersecting at a rotation center of the surveying instrument;
- a camera coupled to the surveying instrument and configured to capture images, the camera having a line of sight that is substantially parallel to the line of site of the surveying instrument and having a projection center located eccentric to the rotation center of the surveying instrument;
- a display device coupled to the apparatus, the display device configured to display the images;
- an input device coupled to the apparatus, the input device configured to receive information identifying object points in the images that are associated with the target;
- a memory device communicatively coupled to at least the camera and the display device, the memory device configured to store the images; and
- a processor coupled to at least the camera, the display device, the input device, and the memory device, the processor configured to:
  - determine image coordinates of a first object point in a first image captured by the camera at a first camera position and orientation, the first object point associated with the target;
  - move the camera to a second camera position and orientation by rotating the camera by about 180° around the vertical axis and by about 180° around the second horizontal axis, wherein the rotation center of the surveying instrument is at substantially the same location at both the first camera position and orientation and the second camera position and orientation, and an optical axis of the camera at the first camera position and orientation is substantially parallel to an optical axis of the camera at the second camera position and orientation;
  - determine image coordinates of a second object point in a second image captured by the camera at the second camera position and orientation, the second object point associated with the target; and
  - determine coordinates of the target relative to the rotation center of the surveying instrument.

12. The apparatus of claim 11 wherein the coordinates of the target are determined based on the first camera position and orientation, the first image coordinates, the second camera position and orientation, the second image coordinates, and camera calibration data.

13. The apparatus of claim 11 wherein the processor is located internal to the apparatus.

14. The apparatus of claim 11 wherein the processor is located external to the apparatus.

15. The apparatus of claim 11 wherein the memory device is located internal to the apparatus.

16. The apparatus of claim 11 wherein the memory device is located external to the apparatus.

17. The apparatus of claim 11 wherein between the first camera position and orientation and the second camera position and orientation the camera is rotated by 180° around the vertical axis and 180° around the second horizontal axis.

18. The apparatus of claim 11 wherein the line of sight of the camera is parallel to the line of site of the surveying instrument.

19. The apparatus of claim 11 further comprising a global navigation satellite system (GNSS) module coupled to the apparatus, the GNSS module configured to receive one or more GNSS signals for determining coordinates of the apparatus.

20. The apparatus of claim 19 wherein the processor is further configured to determine coordinates of the target using the coordinates of the apparatus.

* * * * *